United States Patent [19]

Yamada

[11] Patent Number: 4,970,113
[45] Date of Patent: Nov. 13, 1990

[54] MULTILAYER STRUCTURE AND EASILY OPENABLE CONTAINER AND LID

[75] Inventor: Toyokazu Yamada, Himeji, Japan

[73] Assignee: Idemitsu Petrochemical Co., Ltd., Tokyo, Japan

[21] Appl. No.: 339,489

[22] Filed: Apr. 17, 1989

[30] Foreign Application Priority Data

Apr. 20, 1988 [JP] Japan .................... 63-95386

[51] Int. Cl.$^5$ ............................................. B32B 5/16
[52] U.S. Cl. ................................... 428/323; 428/402; 428/516
[58] Field of Search .............. 428/35.7, 36.92, 463, 428/402, 411.1, 516, 323; 220/265, 266, 276; 206/620

[56] References Cited

U.S. PATENT DOCUMENTS

| | | | |
|---|---|---|---|
| 4,302,554 | 11/1981 | Nabeta et al. | 428/462 |
| 4,470,514 | 9/1984 | Dronet | 220/276 |
| 4,521,467 | 6/1985 | Berger | 428/516 |
| 4,656,068 | 4/1987 | Raines | 428/516 |
| 4,673,601 | 8/1987 | Lamping | 428/35.7 |
| 4,810,541 | 3/1989 | Newman et al. | 428/35.7 |
| 4,859,514 | 8/1984 | Friedrich et al. | 428/516 |

*Primary Examiner*—James Seidleck
*Attorney, Agent, or Firm*—Antonelli, Terry, Stout & Kraus

[57] ABSTRACT

A multilayer structure comprising (C) a substrate layer, (A) a surface layer of a thermoplastic resin, and (B) an intermediate layer of a thermoplastic resin sandwiched between the (C) substrate layer and the (A) surface layer, wherein the (B) intermediate layer contains 0 to 70% by weight of a flake inorganic filler, the peeling strength between the (A) surface layer and the (B) intermediate layer is from 0.3 to 2.0 kg/15 mm, and the peeling strength between the (B) intermediate layer and the (C) substrate layer is at least 1.2 times as large as the peeling strength between the (A) surface layer and the (B) intermediate layer. When a packaging container is produced by forming the multilayer structure into a container body and sealing the container body with a lid, easy openability and high sealing property will be ensured because the opening of the packaging container is not operated by using the delamination between the sealed portion but by using the easy delamination between the surface layer (A) and the intermediate layer (B). The use of the multilayer structure for production of packages is economically advantageous because the recovered scrap can be reused as the material for the substrate layer (C) without affecting the peelability of the surface layer (A).

18 Claims, 1 Drawing Sheet

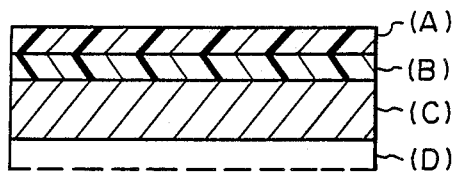
Fig. 1
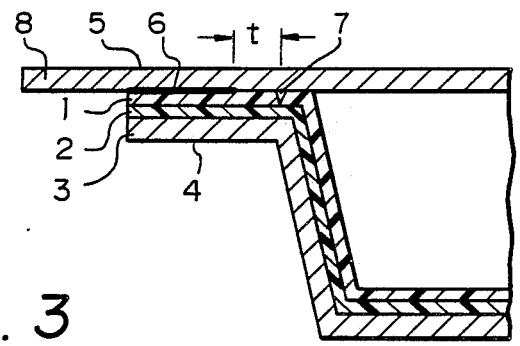
Fig. 2
Fig. 3
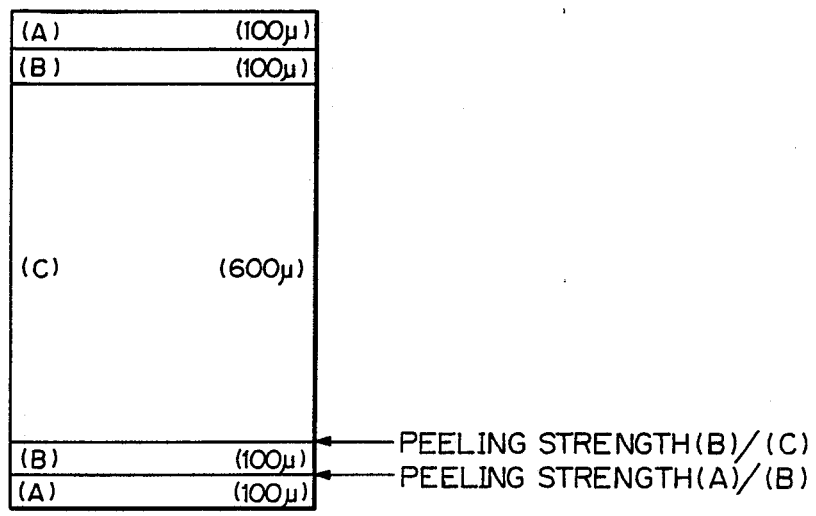

MULTILAYER STRUCTURE AND EASILY OPENABLE CONTAINER AND LID

BACKGROUND OF THE INVENTION (a) Field of the Invention

The present invention relates to a multilayer structure which may be suitably used in packaging industry, particularly for production of containers, and to an easily openable container and an easily openable lid produced by using the multilayer structure, which due to their excellent sealing property and openability, may be suitably used for storage or packaging of foodstuffs, medicines, cosmetics, and the like.

(b) Description of the Related Art

When packaging articles, particularly when packaging foodstuffs, boiling or retorting has been conducted to sterilize the articles after they are filled in containers. At the time of boiling or retorting, the containers cannot withstand the interior pressure without increasing the sealing strength between the container body and the lid member, while an increased sealing strength causes the decrease of openability when the container is opened for using the content. In Japanese Patent Application Laid-open No. 62-251363, disclosed is an easily openable container excelling in both sealing property and easy openability, wherein the above problems are solved by a particular technique. That is, in this technique, opening the container at the time of use is not conducted by general peeling of the sealed portion, but a multilayer container is used as the container body to utilize an interface between its layers as the open plane to be peeled for opening the sealed container, and the inner surface layer is provided with a notch at a periphery inner to the sealed portion so that the lid member is peeled off together with the inner surface layer, and the multilayer container inside the notch will remain as it is without peeling off its inner surface layer.

However, the container also has a problem in that it is difficult to uniformly control the peeling strength of the layer to be peeled off and, therefore, stable openability cannot be obtained.

SUMMARY OF THE INVENTION

An object of the present invention is to provide a multilayer structure which ensures a stable peeling strength regardless of the alteration of molding conditions, the combination of the resin materials of layers, and the like, can make the most of the characteristics of the base materials by varying the combination of the resin materials, and, further, can be recovered as scrap to be reused as material.

Another object of the present invention is to provide an easily openable container and an easily openable lid by using the multilayer structure, both having excellent sealing property and openability.

The inventors studied diligently to attain the above objects and found that the above problems can be solved by using a multilayer structure having a particular layer construction to produce containers or lids, and has consequently completed the present invention.

That is, the present invention provides a multilayer structure comprising (C) a substrate layer, (A) a surface layer of a thermoplastic resin, and (B) an intermediate layer of a thermoplastic resin sandwiched between the (C) substrate layer and the (A) surface layer, wherein the (B) intermediate layer contains 0 to 70% by weight of a flake inorganic filler, the peeling strength between the (A) surface layer and the (B) intermediate layer is from 0.3 to 2.0 kg/15 mm, and the peeling strength between the (B) intermediate layer and the (C) substrate layer is at least 1.2 times as large as the peeling strength between the (A) surface layer and the (B) intermediate layer.

Further, the present invention provides a multilayer sheet comprising (C) a substrate layer, (A) a surface layer of a thermoplastic resin, and (B) an intermediate layer of a thermoplastic resin sandwiched between the (C) substrate layer and the (A) surface layer, wherein the (B) intermediate layer contains 0 to 70% by weight of a flake inorganic filler, the peeling strength between the (A) surface layer and the (B) intermediate layer is from 0.3 to 2.0 kg/15 mm, and the peeling strength between the (B) intermediate layer and the (C) substrate layer is at least 1.2 times as large as the peeling strength between the (A) surface layer and the (B) intermediate layer.

Further, the present invention provides an easily openable container having a flange for sealing the container circularly with a lid, wherein the flange is composed of (C) a substrate layer, (A) a surface layer of a thermoplastic resin for bonding the container to a lid to seal the container, and (B) an intermediate layer of a thermoplastic resin sandwiched between the (C) substrate layer and the (A) surface layer, the (B) intermediate layer containing 0 to 70% by weight of a flake inorganic filler, the peeling strength between the (A) surface layer and the (B) intermediate layer being from 0.3 to 2.0 kg/15 mm, and the peeling strength between the (B) intermediate layer and the (C) substrate layer being at least 1.2 times as large as the peeling strength between the (A) surface layer and the (B) intermediate layer, and a circular weakening line is formed in the (A) surface layer at a periphery inner to the circular portion at which the circular sealing is to be conducted.

Further, the present invention provides an easily openable lid for a container having a flange for sealing the container circularly with a lid, wherein the easily openable lid is composed of (C) a substrate layer, (A) a surface layer of a thermoplastic resin for bonding the lid to the container to seal the container at the flange portion, and (B) an intermediate layer of a thermoplastic resin sandwiched between the (C) substrate layer and the (A) surface layer, the (B) intermediate layer containing 0 to 70% by weight of a flake inorganic filler, the peeling strength between the (A) surface layer and the (B) intermediate layer being from 0.3 to 2.0 kg/15 mm, and the peeling strength between the (B) intermediate layer and the (C) substrate layer being at least 1.2 times as large as the peeling strength between the (A) surface layer and the (B) intermediate layer, and a circular weakening line is formed in the (A) surface layer at a periphery inner to the circular portion at which the circular sealing is to be conducted.

Further, the present invention provides an easily openable packaging container comprising a flanged multilayer container body and a lid member, wherein the flange portion of the container body is composed of (C) a substrate layer, (A) a surface layer of a thermoplastic resin circularly and permanently bonded to the lid member to seal the container body, and (B) an intermediate layer of a thermoplastic resin sandwiched between the (C) substrate layer and the (A) surface layer, the (B) intermediate layer containing 0 to 70% by weight of a flake inorganic filler, the peeling strength between the (A) surface layer and the (B) intermediate layer being from 0.3 to 2.0 kg/15 mm, and the peeling strength between the (B) intermediate layer and the (C) substrate layer being at least 1.2 times as large as the peeling strength between the (A) surface layer and the (B) intermediate layer, and a circular weakening line is formed in the (A) surface layer at a periphery inner to the circularly sealed portion.

Further, the present invention provides an easily openable packaging container comprising a flanged container body and a multilayer lid member, wherein the lid member is composed of (C) a substrate layer, (A) a surface layer of a thermoplastic resin circularly and permanently bonded to the container body to seal the container at the flange portion, and (B) an intermediate layer of a thermoplastic resin sandwiched between the (C) substrate layer and the (A) surface layer, the (B) intermediate layer containing 0 to 70% by weight of a flake inorganic filler, the peeling strength between the (A) surface layer and the (B) intermediate layer being from 0.3 to 2.0 kg/15 mm, and the peeling strength between the (B) intermediate layer and the (C) substrate layer being at least 1.2 times as large as the peeling strength between the (A) surface layer and the (B) intermediate layer, and a circular weakening line is formed in the (A) surface layer at a periphery inner to the circularly sealed portion.

The multilayer structure according to the present invention enables the the uniform control of peeling strength regardless of the alteration of the molding conditions, the combination of the resin materials each used for each layer, and the like. Further, the recovery and reuse of the scrap container is very easy because of the recovered scrap can be mixed in the substrate layer (C) in any amount without affecting the peeling strength. Also, it is possible to make the most of the characteristics of the base materials because the range of choice of the base materials is very wide.

The easily openable container and the easily openable lid made from the multilayer structure excel in sealing property and openability and, as well, have a stable peeling strength at the time of opening. They can, therefore, tolerate boiling or retorting and have a large value in practical use.

BRIEF DESCRIPTION OF THE DRAWINGS

FIG. 1 is a partially elevational view of an embodiment of the multilayer structure according to the present invention.

FIG. 2 is a partially elevational view of an embodiment of the easily openable container according to the present invention.

FIG. 3 is a view illustrating another embodiment of the multilayer structure according to the present invention, which is used in the Examples.

PREFERRED EMBODIMENT OF THE PRESENT INVENTION

There is no particular restriction in the materials for the substrate layer to be used in the present invention, and some illustrative examples of the materials which may be used for the substrate layer include polyolefin resins such as polyethylene and polypropylene, polystyrene resins, polyamide resins, polyester resins, polycarbonate resins, ethylene-vinyl alcohol copolymer, polyvinylidenechloride resin, polyacrylic acid resins, or mixtures wherein the above resins are mixed with a thermoplastic elastomer, various additives or 20 to 80% by weight of an inorganic filler. Among these, the preferred are polyolefins containing 20 to 80% by weight of an inorganic filler, and the use of such polyolefins provides multilayer structure having a high rigidity, high heat resistance, and capability to be easily incinerated.

The preferred polyolefin resins are polypropylene resins, polyethylene resins, and resin mixtures thereof. The polypropylene resins which may be used include, in addition to highly crystalline propylene homopolymer, random copolymers with an α-olefin such as ethylene, butene-1, pentent-1, 3-methylbutene-1 or 4-methylpentene-1 or mixtures thereof. The random copolymers include mixtures thereof with homopolypropylene, which is generally obtained in a multistage polymerization. The preferred copolymers are those having a copolymerization monomer content of not more than 10 mol %. Preferably, these polypropylene resins have a melt index of from 0.1 to 20.

The polyethylene resins which may be used include either low density polyethylenes (such as high pressure process low density polyethylene and linear low density polyethylene) or medium density polyethylenes or high density polyethylenes, and also include, in addition to ethylene homopolymer, copolymers with an α-olefin such as propylene, butene-1, pentene-1, 3-methylbutene-1, and 4-methylpentene-1 or vinyl acetate, and mixtures thereof. The preferred copolymers are those having a copolymerization monomer content of not more than 10% by weight. Further, these polyethylene resins preferably have a melt index of from 0.02 to 50 and a density of from 0.900 to 0.975 g/cm$^3$.

When a resin mixture of a polypropylene resin and a polyethylene resin is used, the ratio of the polypropylene resin to the polyethylene resin is preferably from 30:70 to 97:3, more preferably from 36:65 to 95:5, in weight base.

These resins or resin mixtures, if desired, may be blended with a third resin component to improve the compatibility. Some illustrative examples of such a third resin which may be added include modified polyolefins modified with an unsaturated carboxylic acid or a derivative thereof, ethylene-vinyl acetate copolymer, ethylene-acrylate copolymer, ethylene-propylene rubber, ethylene-propylene-diene rubbers, polybutene, polyisobutylene, polybutadiene rubbers, polyisoprene rubbers, atactic poly-4-methylpenetene-1, styrene-butadiene rubber, acrylonitrile-butadiene rubber, and ion-crosslinked olefin copolymers (ionomers). These may be used individually or in a combination of two or more of them. It is preferable to use these third components in an amount of not more than 30 parts by weight per 100 parts by weight of polyolefin resins.

The substrate layer of the present invention may be provided, on its surface opposite to the intermediate layer, with another layer (D) of the other materials in order to improve the gas barrier characteristic or to decrease the deformation of the product container. Some illustrative examples of the layer of the other materials include resin layers such as layeres of ethylene-vinyl alcohol copolymer, polyvinylidenechloride, nylon or polyethyleneterephthalate, aluminum evaporation layer, aluminum foil, aluminum, iron, copper, etc., which have excellent gas barrier characteristic. The layer of the other materials may be only one layer or a laminate of two or more layers, or may be a resin layer containing 10 to 80% by weight of an inorganic filler.

The layer may also be a composite material consisting of the above materials and metal, paper, or the like.

There is no particular restriction in the materials for the surface layer of a thermoplastic resin (A) to be used in the present invention, and some illustrative examples which may be suitably used include polyolefin resins such as polyethylene, polypropylene, and polymethylpentene, nylon, and polyethyleneterephthalate. Among these, polypropylene, high density polyethylene, polymethylpentene, and polyethyleneterephthalate are particularly suitable from the viewpoint of the heat resistance, elution resistance, etc.

In the present invention, the intermediate layer (B) of a thermoplastic resin contains 0 to 70% by weight of a flake inorganic filler. Generally, the thermoplastic resins to be used for the intermediate layer may be similar to the above-described polyolefin resins for the substrate layer (C).

When a thermoplastic resin containing a flake inorganic filler is used as the material for the intermediate layer (B), a moderate and stable peeling strength between the layers (A) and (B) can be easily obtained regardless of the kinds of the resin materials or molding conditions. The preferred examples of the flake inorganic fillers to be used in the present invention are talc and mica. The addition of such a filler facilitates the control of the peeling strength between the surface layer (A) and the intermediate layer (B). Further, regardless of the extrusion conditions at the time of production of the multilayer structure, and regardless of the thermoforming conditions at the time of processing the multilayer structure, a stable peeling strength can be obtained between the layers (A) and (B). If a conventional filler such as calcium carbonate is used as the inorganic filler, the peeling strength between the layers (A) and (B) will be too large to expect easy openability of the container or lid produced therefrom. The preferred content of the flake inorganic filler is from 10 to 70% by weight, more preferably 10 to 60% by weight. If the content of the flake inorganic filler is larger than 70% by weight, the peeling strength may become too small resulting in a difficulty in controlling the peeling strength.

In the multilayer structure of the present invention, the peeling strength between the layers (A) and (B) is adjusted to from 0.3 to 2.0 kg/15 mm, preferably 0.3 to 1.5 kg/15 mm, and the peeling strength between the layers (B) and (C) is adjusted to at least 1.2 times as large as that between (A) and (B), by proper choice of the kinds of the resin materials, the amount of the filler or the like described above. Thus, easy peelability between the surface layer and the intermediate layer is ensured, and peeling resistance between the intermediate layer and the substrate layer is ensured. Consequently, the container and lid produced therefrom are also ensured easy and stable openability.

Although the thickness of each of the layers is not particularly restricted, the preferred thickness of the surface layer (A) varies depending on the kind of the resin, as to ensure delamination. That is, the surface layer (A) should has a sufficient thickness to ensure the delamination between the layers (A) and (B), i.e., a sufficient thickness to make the rupture strength of material larger than the peeling strength. The thickness of the surface layer (A) is generally from 10 to 300 $\mu$m. In consideration of the film forming efficiency, the preferred thickness of the intermediate layer (B) is 30% or less, more preferably 20% or less of the whole thickness of the multilayer structure, and is generally from 10 to 300 $\mu$m. The thickness of the substrate layer (C) is generally from 10 to 3000 $\mu$m.

Because, according to the present invention, the peeling strength between the surface layer (A) and the intermediate layer (B) can be adjusted to an appropriate degree only by varying the amount of the flake inorganic filler while using similar resins for the layers (A) and (B), a combined use and simplification of the apparatus for feeding materials can be practiced in the production of the multilayer structure. Further, the multilayer structure of the present invention has a great advantage in that the fluctuation of the amount of the recovered scrap does not interfere with the production of the multilayer structure because the recovered scrap of the three-layered multilayer structure can be used again as a material for the substrate layer (C) without affecting the peeling strength between the layers (A) and (B) at all. In order to reuse the recovered scrap, it is preferable, from the viewpoint of the facility of secondary processing such as thermoforming, that the polyolefin resin to be used has a large melt tensile force.

For example, the multilayer structure of the present invention may be produced by coextruding, coextrusion-blow molding, or laminating the above-described resins. The laminating techniques which may be employed include, for example, extrusion laminating, hot-melt laminating, dry laminating, and wet laminating. However, two-layered structures composed of the layers (A) and (B) are generally produced by coextrusion technique.

The easily openable container of the present invention is a container having a flange for sealing the container circularly with a lid. The flange of the container has the same multilayer construction, (A), (B), and (C), as of the above-described multilayer structure, the surface layer (A) serving as the sealing surface, and a circular weakening line is formed in the (A) surface layer at a periphery inner to the circular portion at which the circular sealing is to be conducted.

The easily openable lid of the present invention is a lid for a container having a flange for sealing the container circularly with a lid, and the lid has the same multilayer construction as of the above-described multilayer structure, the surface layer (A) being for bonding the lid to the container to seal the container at its flange portion. Further, a circular weakening line is formed in the surface layer (A) at a periphery inner to the circular portion at which the circular sealing is to be conducted.

FIG. 1 is a partially elevational view of an embodiment of the multilayer structure according to the present invention, wherein, (A) represents a surface layer of a thermoplastic resin, (B) represents a intermediate layer of a thermoplastic resin, (C) represents a substrate layer, and (D) represents another layer having gas barrier characteristic which may be provided at need. The multilayer structure may be further provided with additional layers to be named (E), (F), and so on, or with additional layers (B) and (A), in addition to or in place of the layer (D).

FIG. 2 is a partially elevational view of an embodiment of the easily openable container according to the present invention produced by forming the multilayer structure of the present invention, wherein the easily openable container is sealed with a lid member to form an embodiment of the easily openable packaging container according to the present invention. In FIG. 2, the reference numeral 1 represents a surface layer of a thermoplastic resin, the reference numeral 2 represents an intermediate layer of a thermoplastic resin, and the reference numeral 3 represents a substrate layer. The layers 1, 2, and 3 form the multilayer construction consisting of the layers (A), (B), and (C) described above and construct the flange 4 of the container. The reference numeral 5 represents a lid member which is circularly heat-sealed to the upper surface of the flange to form an easily openable packaging container. From the viewpoint of the sealing property, it is preferable to use a lid member made of the same material as of the surface layer. A weakening line 7 is provided in the surface layer at a periphery inner to the circular seal portion 6. The weakening line ensures the cutting of the surface layer at a periphery inner to the flange of the container when the surface layer is peeled together with the lid member at the time of opening. Although the weakening line is generally provided as a circular notch, it may have any form so long as it ensures easy cutting of the surface layer when the lid member is peeled. The space "t" between the inner edge of the heat-seal portion and the weakening line is preferably 0.5 10 mm, more preferably 1 mm or more. The reference numeral 8 represents a picking portion provided for facilitating the peeling-off of the lid member.

The shape of the flange of the container is not particularly restricted and is usually a circle, a quadrilateral, or the like, and the circular heat-seal is carried out at the flange having such a shape. The shape of the container may be either a cup shape or tray shape.

The opening mechanism of the easily openable packaging container produced by using the easily openable container of the present invention will be described below, referring to FIG. 2. At first, the picking portion 8 is lifted up. Then, delamination begins between the surface layer 1 and the intermediate layer 2 in the multilayer container and proceeds to the weakening line 7, with the surface layer peeled off together with the lid member. Subsequently, the surface layer is cut at the weakening line resulting in opening of the container. Therefore, the container can be easily opened regardless of the permanent heat-seal between the lid member and the multilayer container. Further, in contrast to the conventional opening mechanism utilizing the delamination between the sealed surfaces, the opening mechanism contemplated in the present invention ensures the stabilization of the opening force because of the absence of the notch effect, which notch effect might be caused by incomplete seal at the edge of the sealed portion or by the effects of alteration of the sealing conditions or foreign matters. Furthermore, since the delamination of the container is ensured even if the bonding strength between the heat-sealed surfaces is increased, it is possible to produce an easily openable packaging container having so excellent heat resistance as to be tolerable to boiling or retorting. A stable peeling strength of the surface layer is also ensured regardless of the change in the resin materials of the multilayer structure or the conditions of forming containers.

The easily openable container of the present invention may be produced, for example, by vacuum forming, pressure forming or press forming the multilayer structure of the present invention, or by injection molding, injection-blow molding or blow molding the resin materials described above.

The multilayer structure of the present invention may also be used as, in addition to containers, packages in the form of a bag or as lid members for easily openable packaging containers to be opened utilizing the delamination of their lid members.

The present invention is described in more details by the following Examples. The scope of the present invention is, of course, not meant to be limited to these specific Examples.

EXAMPLES 1 TO 36 AND COMPARATIVE EXAMPLES 1 TO 9

Tables 1 to 7 show the resin materials used and peeling strengths between layers of the multilayer structure obtained in each of the Examples and Comparative Examples and estimated delamination property to indicate appropriateness for the production of a packaging container. In the estimated delamination properties, ○ means good delamination property, Δ means moderate delamination property, and x means bad delamination property.

The abbreviations in the Tables mean the following matters.

HDPE-A: IDEMITSU POLYETHYLENE 520MB (MI=0.3) produced by Idemitsu Petrochemical Co., Ltd.

HDPE-B: IDEMITSU POLYETHYLENE 440M (MI=0.9) produced by Idemitsu Petrochemical Co., Ltd.

LDPE: PETROTHENE 172 (MI=3.0) produced by Toso Co., Ltd.

PP-A: IDEMITSU POLYPROPYLENE E-100G (MI=0.5) produced by Idemitsu Petrochemical Co., Ltd.

PP-B: IDEMITSU POLYPROPYLENE F-200S (MI=2.0) produced by Idemitsu Petrochemical Co., Ltd.

PP-C: IDEMITSU POLYPROPYLENE E-250G (block type, MI=1.0) produced by Idemitsu Petrochemical Co., Ltd.

talc: average particle size: 12 $\mu$m calcium carbonate: average particle size: 8 $\mu$m Multilayer Structure In each Examples, the resins (A), (B), and (C) shown in the Tables were extruded simultaneously from three extruders, an extruder A (diameter of screw: 50 mm), an extruder B (diameter of screw: 50 mm), and an extruder C (diameter of screw: 65 mm), respectively, using a feed block and a flat dye to produce a multilayer structure having the multilayer construction consisting of five layers of three kinds as shown in FIG. 3. The thickness of the layer (A), the layer (B), and the layer (C) were respectively 100 $\mu$m, 100 $\mu$m, and 600 $\mu$m.

The measurement of the peeling strength between layers was conducted employing 180° peeling method under the conditions of the width of sample of 15 mm and peeling rate of 300 mm/min.

Easily openable container

Circular containers as shown in FIG. 2 having an opening diameter of 72 mm$\phi$ and a diameter ratio of 0.3 were produced by vacuum forming the multilayer structures obtained in the above Examples. The containers were provided circularly with a notch as the weakening line at the flange portion. After filling water in the containers, each container was heat-sealed with a film (80 $\mu$m) of the same resin as of the surface layer of the container (sealing side), with providing a space "t" of 1.5 mm. After retorting the sealed containers at 120° C. for 30 minutes, the heat-sealed film lids were peeled off to open the containers. All containers exhibited excellent easy openability.

duced in the same manner as above by exchanging the layer constructions of container and lid. The obtained containers also exhibited the same easy openability as of the above containers.

Easily openable lid

TABLE 1

| | (A) | (B) | | (C) | | Peeling strength (kg/15 mm) | | Estimated delamination property |
|---|---|---|---|---|---|---|---|---|
| | | Resin construction (wt. part) | | | | (A)/(B) | (B)/(C) | |
| Example 1 | HDPE-B | HDPE-A | (42) | HDPE-A | (30) | 1.5 | 2.7 | O |
| | | PP-A | (28) | PP-A | (20) | | | |
| | | talc | (30) | talc | (50) | | | |
| Example 2 | HDPE-B | HDPE-A | (36) | HDPE-A | (30) | 1.1 | no delamination | O |
| | | PP-A | (24) | PP-A | (20) | | | |
| | | talc | (40) | talc | (50) | | | |
| Example 3 | HDPE-B | HDPE-A | (30) | HDPE-A | (30) | 0.8 | no delamination | O |
| | | PP-A | (20) | PP-A | (20) | | | |
| | | talc | (50) | talc | (50) | | | |
| Example 4 | HDPE-B | HDPE-A | (24) | HDPE-A | (30) | 0.6 | no delamination | O |
| | | PP-A | (16) | PP-A | (20) | | | |
| | | talc | (60) | talc | (50) | | | |
| Example 5 | HDPE-B | HDPE-A | (20) | HDPE-A | (30) | 0.6 | no delamination | O |
| | | PP-A | (30) | PP-A | (20) | | | |
| | | talc | (50) | talc | (50) | | | |
| Example 6 | HDPE-B | HDPE-A | (42) | HDPE-A | (40) | 1.4 | 2.3 | O |
| | | PP-A | (28) | PP-A | (60) | | | |
| | | talc | (30) | | | | | |
| Comparative example 1 | HDPE-B | HDPE-A | (48) | HDPE-A | (30) | 2.1 | 1.6 | X |
| | | PP-A | (32) | PP-A | (20) | | | |
| | | talc | (20) | talc | (50) | | | |
| Comparative example 2 | HDPE-B | HDPE-A | (42) | HDPE-A | (30) | no delamination | 2.0 | X |
| | | PP-A | (28) | PP-A | (20) | | | |
| | | calcium carbonate | (30) | talc | (50) | | | |
| Comparative example 3 | HDPE-B | HDPE-A | (30) | HDPE-A | (30) | no delamination | 2.6 | X |
| | | PP-A | (20) | PP-A | (20) | | | |
| | | calcium carbonate | (50) | talc | (50) | | | |

Sealed containers having thicknesses of container and lid similar to those of the above containers were pro-

TABLE 2

| | (A) | (B) | | (C) | | Peeling strength (kg/15 mm) | | Estimated delamination property |
|---|---|---|---|---|---|---|---|---|
| | | Resin construction (wt. part) | | | | (A)/(B) | (B)/(C) | |
| Example 7 | PP-B | HDPE-A | (42) | HDPE-A | (30) | 1.5 | 2.7 | O |
| | | PP-A | (28) | PP-A | (20) | | | |
| | | talc | (30) | talc | (50) | | | |
| Example 8 | PP-B | HDPE-A | (36) | HDPE-A | (30) | 1.1 | no delamination | O |
| | | PP-A | (24) | PP-A | (20) | | | |
| | | talc | (40) | talc | (50) | | | |
| Example 9 | PP-B | HDPE-A | (30) | HDPE-A | (30) | 0.8 | no delamination | O |
| | | PP-A | (20) | PP-A | (20) | | | |
| | | talc | (50) | talc | (50) | | | |
| Example 10 | PP-B | HDPE-A | (24) | HDPE-A | (30) | 0.6 | no delamination | O |
| | | PP-A | (16) | PP-A | (20) | | | |
| | | talc | (60) | talc | (50) | | | |
| Example 11 | PP-B | HDPE-A | (20) | HDPE-A | (30) | 0.6 | no delamination | O |
| | | PP-A | (30) | PP-A | (20) | | | |
| | | talc | (50) | talc | (50) | | | |
| Example 12 | PP-B | HDPE-A | (42) | HDPE-A | (60) | 1.5 | 1.9 | O |
| | | PP-A | (28) | PP-A | (40) | | | |
| | | talc | (30) | | | | | |
| Comparative example 4 | PP-B | HDPE-A | (48) | HDPE-A | (30) | 2.1 | 1.6 | X |
| | | PP-A | (32) | PP-A | (20) | | | |
| | | talc | (20) | talc | (50) | | | |
| Comparative example 5 | PP-B | HDPE-A | (42) | HDPE-A | (30) | no delamination | 2.0 | X |
| | | PP-A | (28) | PP-A | (20) | | | |
| | | calcium carbonate | (30) | talc | (50) | | | |
| Comparative example 6 | PP-B | HDPE-A | (30) | HDPE-A | (30) | no delamination | 2.6 | X |
| | | PP-A | (20) | PP-A | (20) | | | |
| | | calcium carbonate | (50) | talc | (50) | | | |

TABLE 3

| | Resin construction (wt. part) | | | | | | Peeling strength (kg/15 mm) | | Estimated delamination property |
|---|---|---|---|---|---|---|---|---|---|
| | (A) | | (B) | | (C) | | (A)/(B) | (B)/(C) | |
| Example 13 | HDPE-A<br>PP-A | (60)<br>(40) | HDPE-A<br>PP-A<br>talc | (42)<br>(28)<br>(30) | HDPE-A<br>PP-A<br>talc | (30)<br>(20)<br>(50) | 1.9 | 2.7 | Δ |
| Example 14 | HDPE-A<br>PP-A | (60)<br>(40) | HDPE-A<br>PP-A<br>talc | (36)<br>(24)<br>(40) | HDPE-A<br>PP-A<br>talc | (30)<br>(20)<br>(50) | 1.4 | no delamination | O |
| Example 15 | HDPE-A<br>PP-A | (60)<br>(40) | HDPE-A<br>PP-A<br>talc | (30)<br>(20)<br>(50) | HDPE-A<br>PP-A<br>talc | (30)<br>(20)<br>(50) | 1.0 | no delamination | O |
| Example 16 | HDPE-A<br>PP-A | (60)<br>(40) | HDPE-A<br>PP-A<br>talc | (24)<br>(16)<br>(60) | HDPE-A<br>PP-A<br>talc | (30)<br>(20)<br>(50) | 0.8 | no delamination | O |
| Example 17 | HDPE-A<br>PP-A | (40)<br>(60) | HDPE-A<br>PP-A<br>talc | (30)<br>(20)<br>(50) | HDPE-A<br>PP-A<br>talc | (30)<br>(20)<br>(50) | 0.8 | no delamination | O |
| Example 18 | HDPE-A<br>PP-A | (60)<br>(40) | HDPE-A<br>PP-A<br>talc | (20)<br>(30)<br>(50) | HDPE-A<br>PP-A<br>talc | (30)<br>(20)<br>(50) | 0.9 | no delamination | O |
| Comparative example 7 | HDPE-A<br>PP-A | (60)<br>(40) | HDPE-A<br>PP-A<br>talc | (48)<br>(32)<br>(20) | HDPE-A<br>PP-A<br>talc | (30)<br>(20)<br>(50) | 2.6 | 1.6 | X |
| Comparative example 8 | HDPE-A<br>PP-A | (40)<br>(60) | HDPE-A<br>PP-A<br>calcium carbonate | (30)<br>(20)<br>(50) | HDPE-A<br>PP-A<br>talc | (30)<br>(20)<br>(50) | no delamination | 2.6 | X |
| Comparative example 9 | HDPE-A<br>PP-A | (60)<br>(40) | HDPE-A<br>PP-A<br>calcium carbonate | (30)<br>(20)<br>(50) | HDPE-A<br>PP-A<br>talc | (30)<br>(20)<br>(50) | no delamination | 2.6 | X |

TABLE 4

| | Resin construction (wt. part) | | | | | | Peeling strength (kg/15 mm) | | Estimated delamination property |
|---|---|---|---|---|---|---|---|---|---|
| | (A) | | (B) | | (C) | | (A)/(B) | (B)/(C) | |
| Example 19 | PP-A<br>LDPE | (80)<br>(20) | HDPE-A | (100) | HDPE-A<br>PP-A<br>talc | (30)<br>(20)<br>(50) | 0.7 | 1.1 | O |
| Example 20 | PP-A<br>LDPE | (80)<br>(20) | HDPE-A<br>PP-A<br>talc | (84)<br>(4)<br>(12) | HDPE-A<br>PP-A<br>talc | (30)<br>(20)<br>(50) | 0.6 | 1.3 | O |
| Example 21 | PP-A<br>LDPE | (80)<br>(20) | HDPE-A<br>PP-A<br>talc | (70)<br>(6)<br>(24) | HDPE-A<br>PP-A<br>talc | (30)<br>(20)<br>(50) | 0.8 | 1.6 | O |
| Example 22 | PP-A<br>LDPE | (80)<br>(20) | HDPE-A<br>PP-A<br>talc | (54)<br>(10)<br>(36) | HDPE-A<br>PP-A<br>talc | (30)<br>(20)<br>(50) | 0.9 | no delamination | O |
| Example 23 | PP-A<br>LDPE | (80)<br>(20) | HDPE-A<br>PP-A<br>talc | (30)<br>(20)<br>(50) | HDPE-A<br>PP-A<br>talc | (30)<br>(20)<br>(50) | 1.0 | no delamination | O |

TABLE 5

| | Resin construction (wt. part) | | | | | | Peeling strength (kg/15 mm) | | Estimated delamination property |
|---|---|---|---|---|---|---|---|---|---|
| | (A) | | (B) | | (C) | | (A)/(B) | (B)/(C) | |
| Example 24 | PP-A<br>LDPE | (80)<br>(20) | HDPE-A | (100) | HDPE-A<br>PP-A<br>talc | (12)<br>(58)<br>(30) | 0.7 | 1.3 | O |
| Example 25 | PP-A<br>LDPE | (80)<br>(20) | HDPE-A<br>PP-A<br>talc | (81)<br>(4)<br>(15) | HDPE-A<br>PP-A<br>talc | (12)<br>(58)<br>(30) | 0.8 | no delamination | O |
| Example 26 | PP-A<br>LDPE | (80)<br>(20) | HDPE-A<br>PP-A<br>talc | (62)<br>(8)<br>(30) | HDPE-A<br>PP-A<br>talc | (12)<br>(58)<br>(30) | 0.8 | no delamination | O |

TABLE 6

| | Resin construction (wt. part) | | | | | | Peeling strength (kg/15 mm) | | Estimated delamination property |
|---|---|---|---|---|---|---|---|---|---|
| | (A) | | (B) | | (C) | | (A)/(B) | (B)/(C) | |
| Example 27 | PP-C | (100) | HDPE-B | (100) | HDPE-A<br>PP-A | (30)<br>(20) | 0.6 | 1.2 | O |

TABLE 6-continued

| | | Resin construction (wt. part) | | | | | Peeling strength (kg/15 mm) | | Estimated delamination property |
|---|---|---|---|---|---|---|---|---|---|
| | | (A) | | (B) | | (C) | | (A)/(B) | (B)/(C) | |
| Example 28 | PP-C | (100) | HDPE-B | (84) | talc | (50) | | | |
| | | | | | HDPE-A | (30) | | | |
| | | | PP-A | (4) | PP-A | (20) | 0.6 | 1.3 | O |
| | | | talc | (12) | talc | (50) | | | |
| Example 29 | PP-C | (100) | HDPE-B | (70) | HDPE-A | (30) | | | |
| | | | PP-A | (6) | PP-A | (20) | 0.7 | 1.5 | O |
| | | | talc | (24) | talc | (50) | | | |
| Example 30 | PP-C | (100) | HDPE-B | (54) | HDPE-A | (30) | | | |
| | | | PP-A | (10) | PP-A | (20) | 0.8 | no delamination | O |
| | | | talc | (36) | talc | (50) | | | |
| Example 31 | PP-C | (100) | HDPE-B | (30) | HDPE-A | (30) | | | |
| | | | PP-A | (20) | PP-A | (20) | 0.8 | no delamination | O |
| | | | talc | (50) | talc | (50) | | | |

TABLE 7

| | | Resin construction (wt. part) | | | | | Peeling strength (kg/15 mm) | | Estimated delamination property |
|---|---|---|---|---|---|---|---|---|---|
| | | (A) | (B) | | (C) | | (A)/(B) | (B)/(C) | |
| Example 32 | PP-B | (100) | HDPE-B | (100) | HDPE-A | (30) | | | |
| | | | | | PP-A | (20) | 0.3 | 1.3 | O |
| | | | | | talc | (50) | | | |
| Example 33 | PP-B | (100) | HDPE-B | (84) | HDPE-A | (30) | | | |
| | | | PP-A | (4) | PP-A | (20) | 0.4 | 1.4 | O |
| | | | talc | (12) | talc | (50) | | | |
| Example 34 | PP-B | (100) | HDPE-B | (70) | HDPE-A | (30) | | | |
| | | | PP-A | (6) | PP-A | (20) | 0.6 | 1.8 | O |
| | | | talc | (24) | talc | (50) | | | |
| Example 35 | PP-B | (100) | HDPE-B | (54) | HDPE-A | (30) | | | |
| | | | PP-A | (10) | PP-A | (20) | 0.9 | no delamination | O |
| | | | talc | (36) | talc | (50) | | | |
| Example 36 | PP-B | (100) | HDPE-B | (30) | HDPE-A | (30) | | | |
| | | | PP-A | (20) | PP-A | (20) | 1.0 | no delamination | O |
| | | | talc | (50) | talc | (50) | | | |

What is claimed is:

1. A multilayer structure comprising a substrate layer, a surface layer of a thermoplastic resin, and an intermediate layer of a thermoplastic resin sandwiched between the substrate layer and the surface layer, wherein the intermediate layer contains no larger than 70% by weight of a flake inorganic filler, the peeling strength between the surface layer and the intermediate layer is from 0.3 to 2.0 kg/15 mm, and the peeling strength between the intermediate layer and the substrate layer is at least 1.2 times as large as the peeling strength between the surface layer and the intermediate layer.

2. The multilayer structure as claimed in claim 1, wherein the substrate layer is a resin layer containing 20 to 80% by weight of an inorganic filler.

3. The multilayer structure as claimed in claim 1, wherein the flake inorganic filler is talc.

4. A multilayer structure comprising a substrate layer, a surface layer of a thermoplastic resin, and an intermediate layer of a thermoplastic resin sandwiched between the substrate layer and the surface layer, wherein the intermediate layer contains 10 to 70% by weight of a flake inorganic filler, the peeling strength between the surface layer and the intermediate layer is 0.3 to 2.0 kg/15 mm, and the peeling strength between the intermediate layer and the substrate layer is at least 1.2 times as large as the peeling strength between the surface layer and the intermediate layer.

5. The multilayer structure as claimed in claim 2, wherein the substrate layer is a resin layer containing 20 to 80% by weight of an inorganic filler.

6. A multilayer structure comprising a substrate layer, a surface layer of a thermoplastic resin, and an intermediate layer of a thermoplastic resin sandwiched between the substrate layer and the surface layer, wherein the intermediate layer contains 0 to 70% by weight of a flake inorganic filler, the peeling strength between the surface layer and the intermediate layer is from 0.3 to 2.0 kg/15 mm, and the peeling strength between the intermediate layer and the substrate layer is at least 1.2 times as large as the peeling strength between the surface layer and the intermediate layer and wherein the substrate layer is a resin layer containing 20 to 80% by weight of an inorganic filler.

7. A multilayer sheet comprising a substrate layer, a surface layer of a thermoplastic resin, and an intermediate layer of a thermoplastic resin sandwiched between the substrate layer and the surface layer, wherein the intermediate layer contains no larger than 70% by weight of a flake inorganic filler, the peeling strength between the surface layer and the intermediate layer is from 0.3 to 2.0 kg/15 mm, and the peeling strength between the intermediate layer and the substrate layer is at least 1.2 times as large as the peeling strength between the surface layer and the intermediate layer.

8. The multilayer sheet as claimed in claim 7, wherein the substrate layer is a resin layer containing 20 to 80% by weight of an inorganic filler.

9. The multilayer structure as claimed in claim 7, wherein the flake inorganic filler is talc.

10. A multilayer sheet comprising a substrate layer, a surface layer of a thermoplastic resin, and an intermediate layer of a thermoplastic resin sandwiched between the substrate layer and the surface layer, wherein the intermediate layer contains 10 to 70% by weight of a flake inorganic filler, the peeling strength between the surface layer and the intermediate layer is from 0.3 to 2.0 kg/15 mm, and the peeling strength between the intermediate layer and the substrate layer is at least 1.2 times as large as the peeling strength between the surface layer and the intermediate layer.

11. The multilayer sheet as claimed in claim 10, wherein the substrate layer is a resin layer containing 20 to 80% by weight of an inorganic filler.

12. A multilayer sheet comprising a substrate layer, a surface layer of a thermoplastic resin, and an intermediate layer of a thermoplastic resin sandwiched between the substrate layer and the surface layer, wherein the intermediate layer contains 0 to 70% by weight of a flake inorganic filler, the peeling strength between the surface layer and the intermediate layer is from 0.3 to 2.0 kg/15 mm, and the peeling strength between the intermediate layer and the substrate layer is at least 1.2 times as large as the peeling strength between the surface layer and the intermediate layer and wherein the substrate layer is a resin layer containing 20 to 80% by weight of an inorganic filler.

13. An easily openable lid for a container having a flange for sealing the container circularly with a lid, wherein the easily openable lid comprising a substrate layer, a surface layer of a thermoplastic resin for bonding the lid to the container to seal the container at the flange portion, and an intermediate layer of a thermoplastic resin sandwiched between the substrate layer and the surface layer, the intermediate layer containing no larger than 70% by weight of flake inorganic filler, the peeling strength between the surface layer and the intermediate layer being from 0.3 to 2.0 kg/15 mm, and the peeling strength between the intermediate layer and the substrate layer being at least 1.2 times as large as the peeling strength between the surface layer and the intermediate layer, and a circular weakening line is formed in the surface layer at a portion located inwardly from a peripheral circular portion at which the circular sealing is to be conducted.

14. An easily openable lid as claimed in claim 13, wherein the flake inorganic filler is talc.

15. The easily openable lid as claimed in claim 13, wherein the substrate layer is a resin layer containing 20 to 80% by weight of an inorganic filler.

16. A easily openable lid for a container having a flange for sealing the container circularly with a lid, wherein the easily openable lid comprises a substrate layer, a surface layer of a thermoplastic resin for bonding the lid to the container to seal the container at the flange portion, and an intermediate layer of a thermoplastic resin sandwiched between the substrate layer and the surface layer, the intermediate layer containing 10 to 70% by weight of a flake inorganic filler, the peeling strength between the surface layer and the intermediate layer being from 0.3 to 2.0 kg/15 mm, and the peeling strength between the intermediate layer and the substrate layer being at least 1.2 times as large as the peeling strength between the surface layer and the intermediate layer, and a circular weakening line is formed in the surface layer at a portion located inwardly from a peripheral circular portion at which the circular sealing is to be conducted.

17. The easily openable lid as claimed in claim 16, wherein the substrate layer is a resin layer containing 20 to 80% by weight of an inorganic filler.

18. A easily openable lid for a container having a flange for sealing the container circularly with a lid, wherein the openable lid comprises a substrate layer, a surface layer of a thermoplastic resin for bonding the lid to the container to seal the container at a flange portion, and an intermediate layer of a thermoplastic resin sandwiched between the substrate layer and the surface layer, the intermediate layer containing 0 to 70% by weight of a flake inorganic filler, the peeling strength between the surface layer and the intermediate layer being from 0.3 to 2.0 kg/15 mm, and the peeling strength between the intermediate layer and the substrate layer being at least 1.2 times as large as the peeling strength between the surface layer and the intermediate layer, and a circular weakening line is formed in the surface layer at a portion located inwardly from a peripheral circular portion at which the circular sealing is to be conducted and wherein the substrate layer is a resin layer containing 20 to 80% by weight of an inorganic filler.

* * * * *